Figure 1:
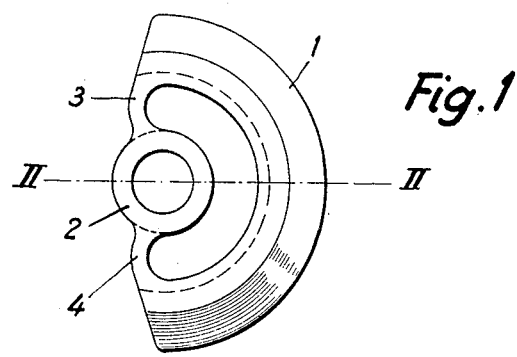

United States Patent Office 2,746,238
Patented May 22, 1956

2,746,238

ROCKABLE WEIGHT FOR SELF-WINDING WATCHES

Heinrich Stamm, Grenchen, Switzerland, assignor to Eterna Limited, Precision Factory, Grenchen, Switzerland, a Swiss joint-stock company Application May 6, 1952, Serial No. 286,243

Claims priority, application Switzerland May 10, 1951

7 Claims. (Cl. 58—82)

This invention relates to self-winding watches and more particularly to the rockable weights or centrifugal masses forming part of the clockwork and, being set moving by the movements of the watch bearer, providing the automatically active winding power.

The invention has particular reference to the type of rockable weight provided with a heavy rim of circular segment shape extending through an angle, centered in the segment center point, of approximately 180°.

In the rockable weight according to the present invention the hub surrounding its center point is connected with the heavy rim by at least one elastically yielding carrier member, the points of connection of the hub with the rim being arranged symmetrically to the line connecting the center point of the rockable weight with its center of gravity and the carrier members being staggered by at least 90° relative to this connecting line.

In the manufacture of the rockable weight masses according to this invention the plate connecting the heavy rim with the hub are formed with an aperture which is so diemensioned that there remains over as connecting the rim with the hub only one or two elastic carrier member or members.

In the drawing affixed to this specification two embodiments of the invention are illustrated diagrammatically by way of example.

In the drawing

Fig. 1 is a plan view, and

Figure 2:
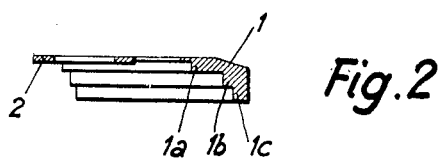

Fig. 2 a cross-section on the line II—II in Fig. 1 of the first embodiment.

Figure 3:
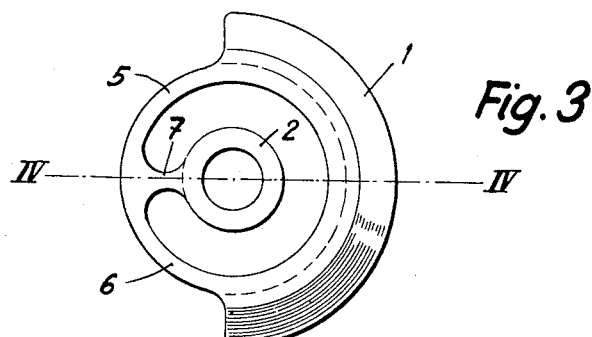
Figure 4:
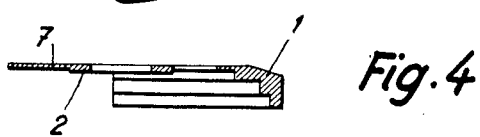

Figs. 3 and 4 are similar views of the second embodiment.

Referring to the drawing and first to Figs. 1 and 2, 1 is the semi-annular rim which forms the rockable weight proper and 2 is an annular hub. The rim is formed on the bottom side with annular sections of stepwise outwardly increasing thickness and weight 1a, 1b and 1c. The thin hub 2 is connected with the inner circumference of the thinnest rim section 1a merely by two thin and elastic arms 3 and 4 forming the carrier members which are arranged symmetrically to the line connecting the hub center point with the point of gravity of the rim and are staggered at least by 90° relative to this line.

In the embodiment here shown the slender elastic arms 3, 4, the hub and the heavy rim are supposed to be made of the same material, but obviously they might also consist of different materials.

In the second embodiment shown in Figs. 3 and 4 the elastic carrier members are constituted by two curved arms 5 and 6 extending from the inner circumferential part of the rim and uniting on the center line passing through the hub, and a radial arm 7 merging into the arms 5 and 6 and having the hub 2 fixed to it. Here also the thickness of the hub and the carrier arms is very much lower than that of the weighted rim 1. Here also the places where the arms 5 and 6 meet the rim, are situated symmetrically to the axis IV—IV and are staggered at least by 90° to this axis.

The two embodiments here shown possess a sufficient rigidity as regards shocks meeting them in the plane in which the rim rotates, and in this point there are prior art devices which have a single arm connecting the rim and the hub. This arm does not lie on the line defined by the center of rotation and the center of gravity of the rockable weight and these devices are therefore greatly inferior to the device according to this invention. As compared with other prior art devices which have a single arm extending on the line defined by the center of rotation and the center of gravity of the rockable weight, the possibilities of bending under the impact shocks arising at right angles to the plane of rotation are far greater because the lever arm and in consequence thereof also the turning moment is greater. In the prior art devices in which the arm is connected to an end of the rim, there is the risk that this arm may be stressed unduly by a shock directed in the plane of rotation of the rockable weight. In the case where the arm is connected to the middle of the rim, the lever arm coming into play in the case of a shock perpendicular to the plane of rotation of the rockable weight is very short and such a device yields elastically only very poorly. In contrast thereto in the embodiment of this invention shown in Figs. 1 and 2 the length of the effective lever arm corresponds to the distance between the center of gravity and the axis of one of the arms 3 or 4, which is about the distance between the center of gravity and the center or rotation. Since in centrifugal masses of this kind the outer diameter of the hub is relatively great, the difference in the length of the lever arms becomes considerable also so that in spite of the fact that in the device according to the invention two connecting arms are present, the additional torsional stress and the longer lever arms, the bending is greater than that which arises in the prior art devices formed with only one arm extending along the line connecting the center of gravity with the center of rotation. As compared to another kind of prior art centrifugal masses, in which the weighted rim and the hub are connected by means of a plate substantially covering the entire space between the hub and the rim, the rockable weight according to this invention offers the advantage of a greater possibility of bending of the members connecting the hub with the rim.

Therefore the invention creates a connection between the hub and the weighted rim which possesses the rigidity required to take up shocks arising in the plane of rotation and this connection warrants the greatest possible bending capacity under shocks arising at right angles to the plane without it being necessary to use unduly thin connecting members.

I wish it to be understood that I do not desire to be limited to the details shown in the drawing and described in the foregoing specification for obvious modifications will occur to a person skilled in the art.

I claim:

1. A rockable weight for self-winding watches consisting of a weighted annular segment extending through about half a circle, a hub in the center of said circle and a pair of elastic carrying members forming the only connection between said hub and said weighted segment.

2. A rocking weight for self-winding watches consisting of a weighted annular segment extending through about half a circle, a hub in the center of said circle, and resilient means emanating from the two free ends of said segment for supporting said hub on said two free ends exclusively.

3. A rocking weight for self-winding watches according to claim 2, wherein the resilient supporting means consist of two substantially opposed radial bridges connecting said hub with said two free ends of the segment.

4. A rocking weight for self-winding watches according to claim 2, wherein the resilient supporting means consist of a substantially semi-circular bridge encircling said hub, and a radial bridge extending from the center of said semi-circular bridge to said hub.

5. A rocking weight for self-winding watches consisting of a weighted annular segment extending through about a half-circle, a hub in the center of said circle, and only two resilient bridge members supporting said hub on the two free ends of said segment exclusively.

6. A rocking weight for self-winding watches according to claim 5, wherein the bridge members are two substantially opposed radial members which connect the hub with the free ends of the segment.

7. A rocking weight for self-winding watches according to claim 5, wherein one of said bridge members is substantially semi-circular and connects the free ends of the segment, and the other said bridge member is radial and connects the center of said semi-circular bridge member with said hub.

References Cited in the file of this patent

FOREIGN PATENTS 1,903   Germany _____ Jan. 10, 1878

OTHER REFERENCES

Catalogue Bulova Self-Winding Watches, Copyright 1950, Bulova Watch Co., item 344, page 31. (Copy in Div. 61.)